United States Patent [19]

Schindl

[11] 4,057,318
[45] Nov. 8, 1977

[54] MICROSCOPE EYE PIECE FOCUSING APPARATUS FOR USE IN PRODUCING SHARP PHOTOGRAPHS

[75] Inventor: Klaus P. Schindl, Vienna, Austria

[73] Assignee: C. Reichert Optische Werke, Vienna, Austria

[21] Appl. No.: 645,487

[22] Filed: Dec. 31, 1975

Related U.S. Application Data

[63] Continuation of Ser. No. 447,808, March 4, 1974, abandoned.

[30] Foreign Application Priority Data

Mar. 2, 1973 Austria .................................. 1871/73

[51] Int. Cl.² .............................................. G02B 21/18
[52] U.S. Cl. ...................... 350/19; 350/10; 354/79
[58] Field of Search .................. 350/19, 10; 354/79

[56] References Cited

U.S. PATENT DOCUMENTS

| 2,077,792 | 4/1937 | Heine | 350/19 |
|---|---|---|---|
| 2,209,532 | 7/1940 | Michel | 350/19 X |
| 2,845,842 | 8/1958 | Leitz et al. | 350/19 |
| 2,910,913 | 11/1959 | Michel | 350/19 |
| 3,106,129 | 10/1963 | Frenk et al. | 350/19 X |
| 3,421,806 | 1/1969 | Weber | 350/19 |
| 3,582,178 | 6/1971 | Boughton et al. | 350/10 |
| 3,623,807 | 11/1971 | Gabler et al. | 350/19 X |
| 3,672,782 | 6/1972 | Akin | 350/10 X |

FOREIGN PATENT DOCUMENTS 261,256  4/1968  Austria .................................. 350/19

*Primary Examiner*—David H. Rubin
*Attorney, Agent, or Firm*—Alan H. Spencer; Howard R. Berkenstock, Jr.

[57] ABSTRACT

Refractive characteristics of the eye or eyes of a microscopist can result in an unfocused image in the film plane of a camera attachment if accommodation occurs in the objective focusing system and an unfocus image can be prevented by providing a separate image for adjustment of the eyepiece or eyepieces to accommodate refractive characteristics of the eye or eyes of the microscopist independent of the object focusing mechanism.

6 Claims, 10 Drawing Figures

MICROSCOPE EYE PIECE FOCUSING APPARATUS FOR USE IN PRODUCING SHARP PHOTOGRAPHS

This application is a continuation of my co-pending application, Ser. No. 447,808, filed Mar. 4, 1974 and now abandoned.

BACKGROUND OF THE INVENTION

In microscopes, which along with an eye piece, also have a photographic camera for the recording of the observed image of an object, it is known that sharp focusing of the image cast onto the image-recording plane of the camera can be obtained by use of a focusing reticle. In so doing, the image of the focusing reticle and of the object is sharply adjusted in the image plane of the eyepiece.

We can distinguish three basic methods for precise focusing. As the first of these, we can mention the direct observation of the image of the object occuring on a focusing screen of the camera (image recording device) by means of a loupe. This is the simplest but also the least economical method, because it requires adjustments to the camera, and such adjustments are time-consuming.

Greater convenience is afforded by means of a separate special eyepiece having a part of the light conducted to the camera and part diverted to the special photographic eyepiece. However, this requires an expensive construction, and moreover is unwieldy in use because the observer has to shift from the normal observation eyepiece position to a different position for using the precision focusing eyepiece. Continuous observation of the object is necessarily interrupted when this apparatus is used.

It is known also to directly introduce the precision focusing system into the observation eyepiece. The image of a focusing reticle is superimposed over the image of the object being observed and the focusing reticle can be arranged in one or both eye pieces of a binocular tube. The latter arrangement is certainly better than those described above, but does present disadvantages. Thus, when using the microscope for purely visual observation, either the focusing reticle and the eye piece must be exchanged, or else its distraction caused by superimposition on the image must be tolerated. Furthermore, it is disadvantageous for the focusing reticle to be seen only by one eye, because this impairs precise focusing. With optionally removeable focusing reticle, the reproducibility of precise positioning of the reticle is not fully guaranteed.

Another known arrangement utilizes an intermediate image of the object, which together with the image of a focusing reticle, is viewed in an observational device made up in the form of a binocular tube. In this arrangement there is located, between a beam-splitting prism, which divides the beam path issuing from the object into one light path leading to the camera, and one light path leading to the observational device, and to the intermediate plane in the eye piece of the observational light path, a further intermediate image plane, in which the focusing reticle is located. Here, certainly, an observation of the focusing reticle with both eyes is possible; however, such types of arrangements by their very nature are very involved and expensive and/or they detract from the quality of the visual image possible because of the number of optical elements required.

In addition to all these disadvantages, a further disadvantage is inherent in all known devices. The resolution of the focusing reticle is low because it is presented as being dark on a light background, whereby the narrow dark lines on dark objects are difficult to see. This is especially true where dark field illumination and fluorescence microscopy techniques are used.

BRIEF DESCRIPTION OF THE PRESENT INVENTION AND DRAWINGS

The present invention, in comparison to these known arrangements, has substantial advantages and improvements, and relates to a microscope having at least one photographic camera, in which the image of an object on the image-recording plane of the camera can be precisely focused by means of an auxiliary image of a reticle. The reticle contains a convention parallel line image as utilized in microscopy, which produces an auxiliary image that is superimposed over object image in the observation eye piece. Object light from the objective is directed into the eye piece by a beam splitter and the focusing image of the reticle is superimposed on the object image in the eye piece by means of image-forming optics and through a beam splitter, preferably over the same beam splitters used to direct the light leading to the camera and observational eye piece. In addition, the reticle is of the type providing its image as a bright line image on a dark background.

This construction of a microscope incorporates the following advantages; the auxiliary image appears, in the case of utilization of a binocular tube, on both of its eye pieces. As a consequence of the close coupling of the convergence of both eyes with their distance focusing, error from accommodation is extensively reduce, and precise focusing is thereby obtained. Moreover, it is favorable if the exit pupil of the observational eye piece for the image-forming optics of the reticle is essentially larger than that of the objective. The depth of focus is thus reduced for the reticle resulting in easier precise focusing.

In case use of the reticle image is unnecessary, the latter can be readily eliminated, for instance electrically, without any mechanical change (exchange of the ocular) being required. In addition, the reticle system is built-in into the instrument which provides reproducibility of the location of the reticle in the same position. Finally, this construction is essentially simpler and cheaper than the known arrangements, which require an intermediate image and the optics necessary therefore.

With these advantages resulting from the essential basic idea of the invention, further ones are associated in the case of the special construction of the reticle to provide a bright line image on a dark background. This advantage is obvious from the previously noted disadvantage of dark line images on a light background.

In accordance with the invention, the superimposing of the auxiliary image of the critical indicator can also be provided by other beam splitters. It is very advantageous to use beam splitters already required to minimize the optical elements required, thus the beam splitter used in binocular eye piece tubes can serve as the beam splitter for the precision focusing reticle and should be considered for such use. Also, the beam splitter necessary in vertical illumination microscopes for the illumination of the object can thus be used.

The preferred construction of the reticle, according to the invention, is such that it produces a bright line image on a dark background which is very suitable for precision focusing and contrary to the opinion heretofore held, if the lines are located very close to each other their recognition as double lines makes precise focusing possible. With the further measures according to the invention, there is produced a universal applicability of this kind of critical indicators, both for pure still photography as well as for motion picture work.

The bright display of the reticle image requires a light source. In order to prevent having light reach the camera through the beam splitter, the light, at least during the time the camera shutter is open, is shifted away or is interrupted in any convenient manner or turned off. In accordance with the invention, this takes place through coupling the camera shutter with a device for the interruption of the reticle image. An interruption of the electrical circuit of the light source is especially appropriate for still photography. For motion pictures, a mechanical interruption is more suitable and is preferably synchronized with the shutter, so that opening the shutter of the camera interrupts the reticle image.

When interruption occurs through disconnection of the electrical circuit, it is usually required to disconnect a short period of time before the shutter opens, in order to compensate for the afterglow of the lamp. In a further development of the invention, the light is variable, in order to adjust the brightness of the reticle image with respect to object image brightness. This can be done in different ways, either in the lamp electrical circuit, or in the light path itself, where filters of different density, polarization filters, and the like can be utilized.

A preferred development utilizes two coaxial polarizing filters, one of which is stationary and the other one rotatable. The rotatable filter can be connected to the shutter release so that on actuation of the shutter, the rotatable filter is rotated to a ninety-degree position relative to the stationary filter. After release of the activating device, which can include a carrier for the rotatable filter, the latter returns to its initial position, for instance under the stress of a spring. Likewise, an electric motor could be used to control this filter operated by the shutter release. Further, it is also conceivable to provide a displaceable filter disc with several areas of different light transmission and an occluder selectively placable in the light path of the imaging system of precision focusing.

For better understanding of the invention, reference is made to the drawings, with further details. These drawings diagrammatically represent different forms of construction as examples of the invention.

FIG. 2 is an embodiment similar to FIG. 1 with two prisms as beam splitters;

In the figures, equal or analogous parts are designated with the same position numbers.

THE PREFERRED EMBODIMENTS

Figure 1:
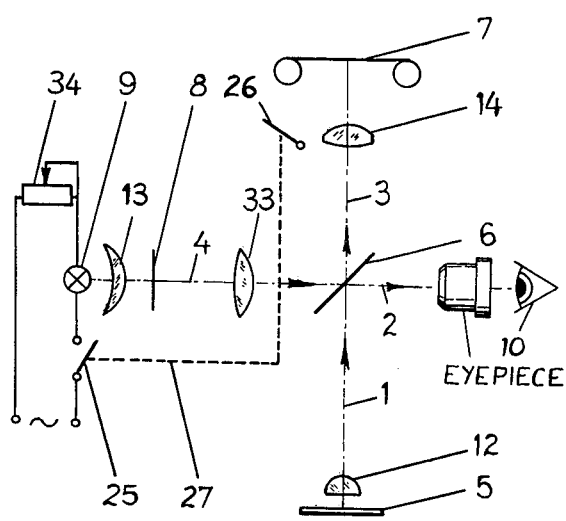

In FIG. 1, the object image light path 1 from the object 5 is partially diverted by beam splitter surface 6, which may be a partially transmissive mirror along observational light path 2 toward the eye piece and the remaining light continues along light path 3. The reticle image light path 4 leads from the light source 9 through the collector lens 13, reticle 8, and the imaging lenses 33 to the beam splitter 6. The camera film plane 7 is shown with infinity corrected lens 14 and shutter release by 26. Eye 10 observes through the eye piece, which, for instance, can be a binocular tube and in which the image of reticle 8 is then transmitted to both eye pieces thereof. The eye piece, or eye pieces in the case of a binocular, is separately focusable in any conventional manner, such as threading into the binocular tube (not shown) to provide adjustment for the refractive characteristics of the microscopist's eye(s) 10. The objective 12 of the microscope is moved in the conventional manner to focus the object 5 in the observer's eye. In the electrical circuit, light source (lamp 9), there is in series with switch 25 and potentiometer 34. Shutter release 26 is coupled with switch 25 as shown by the broken line 27 and can still be opened before opening of the camera shutter, and remains open, as long as the shutter is open. By so doing, light from source 9 is not received in the recording plane 7 of the camera during the exposure. Potentiometer 34 provides for the adjustment of the reticle image brightness, relative to the object image brightness for maximum distinction of the reticle image. Other ways of adjusting the brightness of the reticle image may be substituted by those skilled in the art for the potentiometer 34 shown in FIG. 1.

Figure 2:
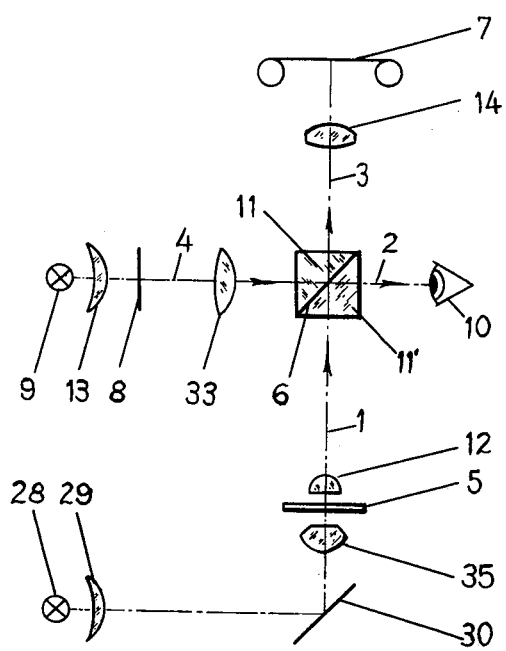
FIG. 2 shows the light path of a basic arrangement using a beam splitter according to the present invention.

FIG. 2 shows essentially the same arrangement as FIG. 1, the object illumination system diagrammatically represented including lamp 28, collector lens 29, mirror 30 and condenser 35. Beam splitter 6 utilizes two prisms 11 and 11' which are cemented together along plane 6 having a partially transmissive coating.

The electrical circuit lamp 9 is not represented here but can be the same as that in FIG. 1.

Figure 3:
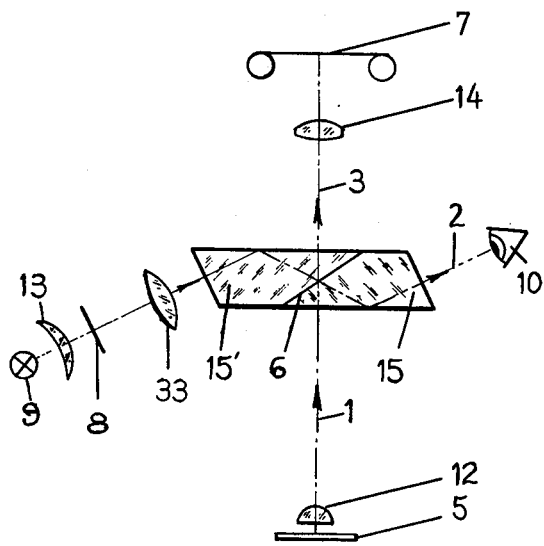
FIG. 3 is an embodiment using an reticle image mirrored from below the prisms.

FIG. 3 is a preferred form of the invention having reticle image beam reflected from the left and below prism 15', and then passing through beam splitter surface 6 into the prism 15, is then reflected through the eyepiece (not shown) to eye 10. As in FIGS. 1 and 2, adjustment of the eyepiece is provided to avoid compensation for the refractive characteristics of eye 10 in the objective focusing system. In practice, the microscopist adjusts the eyepiece to obtain a sharp focus on the reticle image prior to focusing the object 5 image in the conventional manner.

Figure 4:
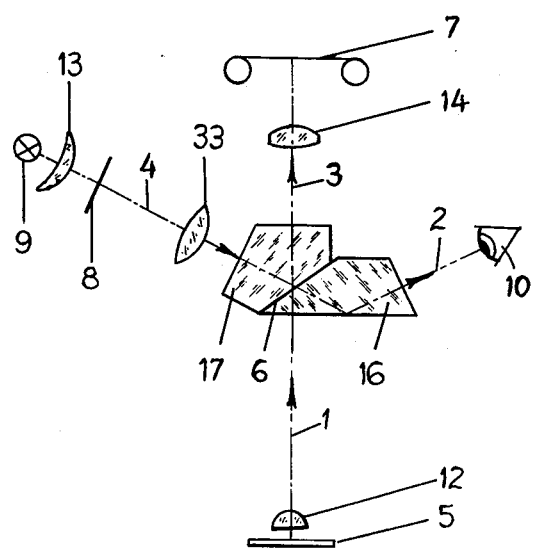
FIG. 4 is another embodiment with a reticle image mirrored from above and with other prism forms.

In FIG. 4, another optical arrangement is diagrammatically illustrated of a prism arrangement for the reticle projection system which may be used if the microscope body has sufficient space available above the eyepiece. Reticle light path 4 again joins the reflected observational light path 2 at beam splitter surface 6 and is reflected therewith by the lower horizontal surface of the prism 16. The other prism 17 is shaped differently to accommodate light paths 3 and 4.

Figure 5:
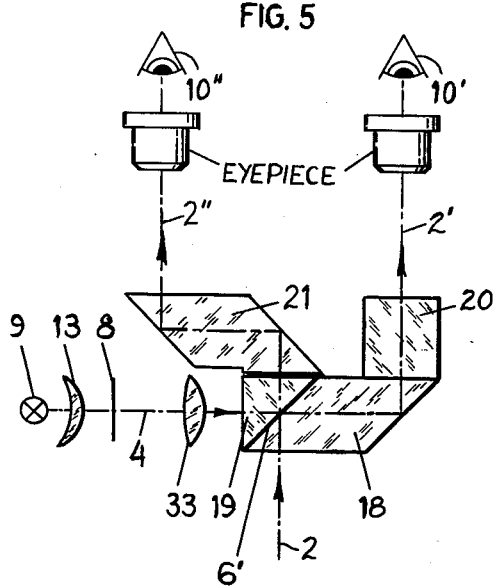
FIG. 5 is an embodiment with the reticle imaged by a beam splitter in both binocular tubes.

FIG. 5 demonstrates how the reflection of the reticle image beam can be directly introduced at the beam splitter surface 6' of a binocular system. The binocular system contains several prisms 18, 19, 20 and 21, which may be cemented together and have been splitter 6' between the prisms 19 and 19'. Reticle image beam 4 produced by light source 9, a collector lens 13, reticle 8, and focusing lens 33 is superimposed on the observational beam 2 by beam splitter 6' and conducted to prisms 20 and 21 by prisms 18 and 19 to both eye pieces and the respective eyes 10' and 10" along paths 2' and 2".

Figure 6:
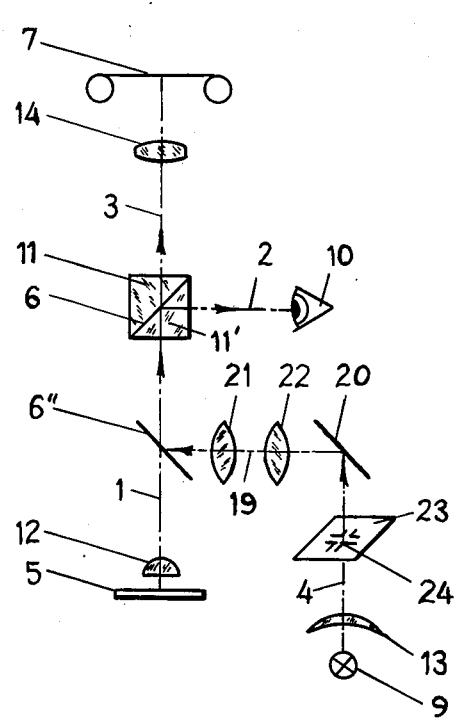
FIG. 6 is an embodiment with mirror reflection of the reticle image into the optical path of the microscope below the beam splitter.

In FIG. 6, an arrangement with a conventional projection drawing surface 23 is substituted by reticle 24. Lamp 9 and collector lens 13 illuminate the reticle 24 and the reticle image beam 4 is conducted by mirror 20 over optics 21, 22 to the partially transmissive mirror 6" where both light paths 1 and 19 combine. The remaining optics are substantially the same as those of FIG. 2.

Figure 7:
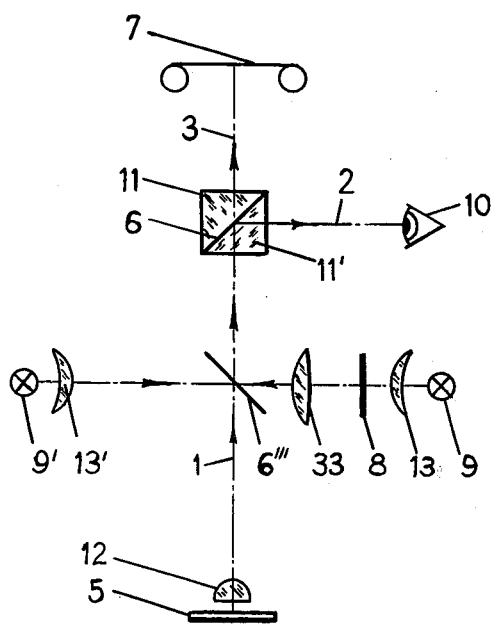
FIG. 7 is an embodiment exemplifying a vertical illumination system using the present invention.

In FIG. 7, an arrangement is shown for vertical illumination system of the object 5. Lamp 9', condenser 13' and the partially transmissive mirror 6''' illuminate object 5. Mirror 6''' also reflects the reticle image beam produced by light source 9, the collector lens 13, reticle 8 and focusing lens 33 coincident with the object light path 1, which then divides at the beam splitter 6 into camera light path 3 and the observation light path 2.

Figure 8:
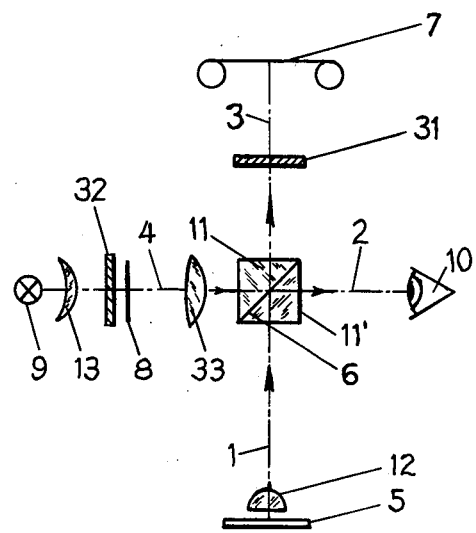
FIG. 8 shows the arrangement of two polarization filters in the embodiment of FIG. 2.

FIG. 8 shows another arrangement to prevent pentration of light from the reticle into the camera. Two polarization filters 31 and 32 are used. Polarization filter 32 is located in the reticle light path 4 and the other polarization filter 31 in camera light path 3. Polarization filter 31 can be selectively rotated to a position 90° to the polarization plane of filter 32 so that only a negligible quantity of light can reach the camera from reticle 8 during exposure of the film.

Figure 9:
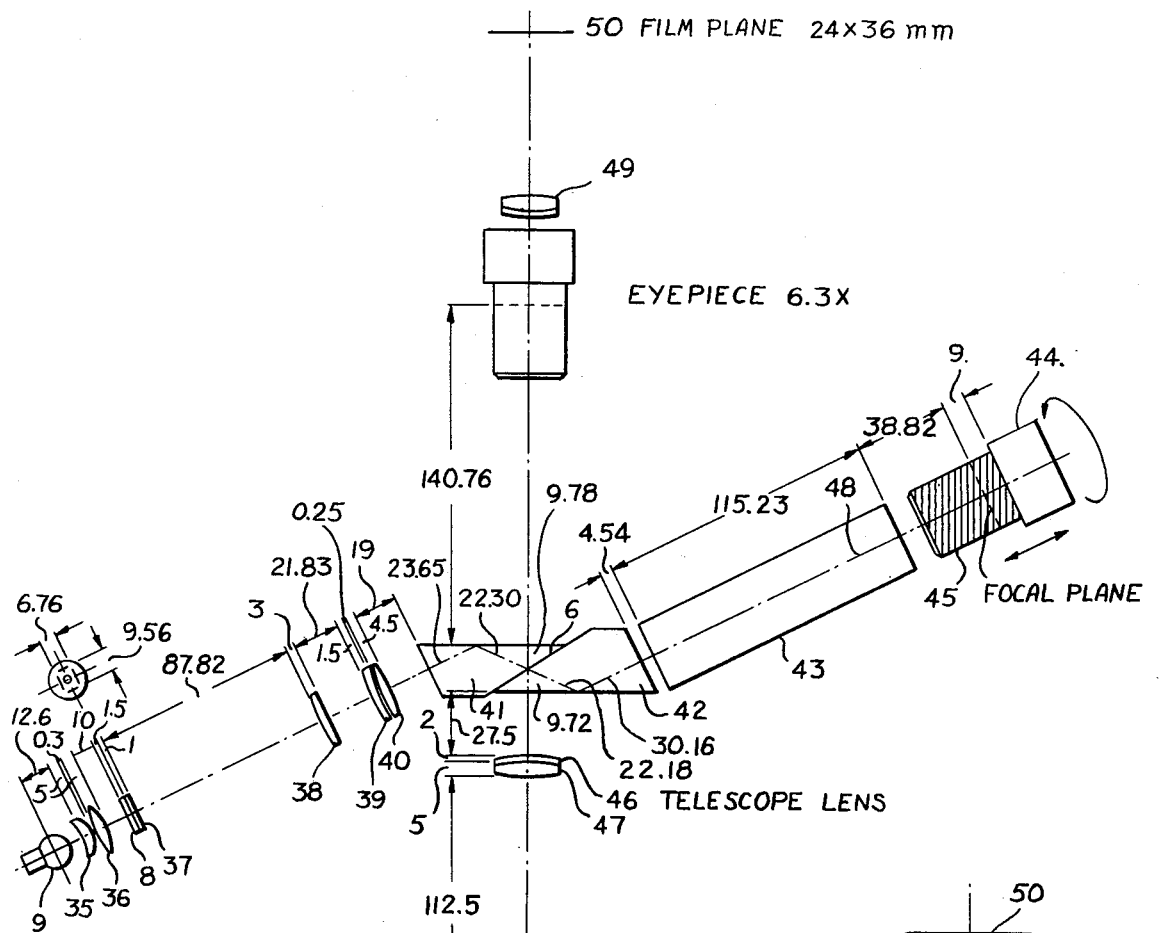
FIG. 9 shows the specific optical elements of a preferred embodiment.
Figure 10:
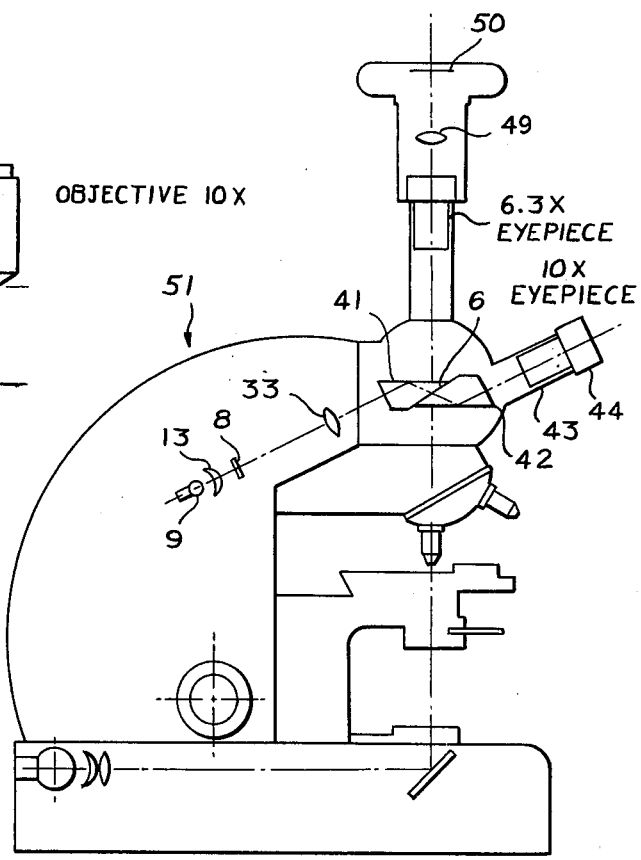
FIG. 10 shows a microscope incorporating the present invention.

FIG. 9 illustrates the specific optics of a preferred embodiment of the present invention with optical parameters as shown in the table foregoing the description of FIG. 9 and FIG. 10 shows the arrangement of such an optical system in a microscope 51. Lamp 9 has a condenser lens system lenses 35 and 36 to illuminate reticle 8. Lenses 37, 38, 39 and 40 focus the reticle image projected through prisms 41 and 42 through eyepiece tube 43 to eyepiece 44. Eyepiece tube 43 is internally threaded to accomodate external threads 45 on eyepiece 44. Accomodation of the optical characteristics of the microscopists eye is obtained by rotation of the eyepiece which causes a corresponding change in the distance between the reticle focusing lens system 37, 38, 39 and 40 as shown by the double arrow. The microscope has a 10X objective for illustration purposes which transmits the image of object 5 through telescope lenses 46 and 47 to beam splitter 6. The light from the object image is divided at beam splitter 6 with a portion deflected along the optical axis 48 of the eyepiece tube for observation and the remaining portion passing through toward the 6.3 eyepiece used in conjunction with a camera having an infinity corrected lens 49 and film plane 50. The values of the lenses in the reticle projection and microscope lens system are as follows:

|  | Radius | Refractive Index |
| --- | --- | --- |
| Lens 35 | −23,579 | 1,52288 |

-continued

|  | Radius | Refractive Index |
| --- | --- | --- |
|  | −8,979 |  |
| Lens 36 | 62,478 | 1,52288 |
|  | −20,277 |  |
| Reticle 3 | ∞ | 1,52288 |
| Lens 37 | ∞ | 1,51680 |
|  | 74,912 |  |
| Lens 38 | 86,400 | 1,78472 |
|  | 885,693 |  |
| Lens 39 | 93,429 | 1,78472 |
|  | 30,353 |  |
| Lens 40 | 30,353 | 1,56883 |
|  | −88,716 |  |
| Prism 41 | ∞ | 1,62004 |
| Prism 42 | ∞ | 1,62004 |
| Lens 47 | 115,205 | 1,55836 |
|  | −88,716 |  |
| Lens 46 | −88,716 | 1,43389 |
|  | −178,371 |  |

What is claimed is:

1. A microscope for observing an object with an eye and photographing said object with a camera comprising
a body,
an observation optical system incorporated in said body and including an objective and an eyepiece aligned along a first optical axis, said eye and said eyepiece in combination having an effective focal plane, focusing means to form an image of said object in said effective focal plane,
a reference focusing system incorporated in said body and including a reticle aligned along a second optical axis which intersects said first optical axis, means to project an image of said reticle to a position along said first optical axis, means to prevent projection of said image during photographic exposure, means to move said eyepiece along said first optical axis for observing said image of said reticle in focus, said effective focal plane being located on said first optical axis at said position when the image of the reticle is observed in-focus,
a photographic optical system being adapted to connect to said body and having said camera on a third optical axis which intersects said first optical axis in said body, said first, second and third optical axes having a common intersection, said camera further including a film plane and said film plane being located on said third optical axis at a location optically equivalent, with respect to said object, to said position,
whereby focusing an image of said object at the position provides in-focus imaging of said object at said film plane.

2. The microscope according to claim 1 wherein said means to project an image further includes a beam splitter positioned at the intersection of said first and second and third optical axes.

3. The microscope according to claim 1 wherein said photographic optical system further includes a partially reflective element positioned at the intersection of said first, second and said third optical axes.

4. The microscope according to claim 1 wherein said reference focusing system further includes a light source, a collimating lens and a projection lens.

5. The microscope according to claim 1 wherein said means to extinguish said light source is synchronized with the shutter of said camera.

6. The microscope according to claim 1 wherein said reticle has parallel slits to produce a light image of parallel lines on a dark background.

* * * * *